(12) United States Patent
Li et al.

(10) Patent No.: US 11,669,204 B2
(45) Date of Patent: Jun. 6, 2023

(54) DATA PROCESSING METHOD AND APPARATUS, AND SMART INTERACTION DEVICE

(71) Applicant: BOE TECHNOLOGY GROUP CO., LTD., Beijing (CN)

(72) Inventors: Yingjie Li, Beijing (CN); Liping Lei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/632,251

(22) PCT Filed: Mar. 10, 2021

(86) PCT No.: PCT/CN2021/080017
§ 371 (c)(1),
(2) Date: Feb. 2, 2022

(87) PCT Pub. No.: WO2021/218421
PCT Pub. Date: Nov. 4, 2021

(65) Prior Publication Data
US 2022/0269369 A1 Aug. 25, 2022

(30) Foreign Application Priority Data
Apr. 30, 2020 (CN) .......................... 202010362845.0

(51) Int. Cl.
*G06F 3/041* (2006.01)
*G06F 3/0354* (2013.01)
*G06F 3/04883* (2022.01)

(52) U.S. Cl.
CPC ........ *G06F 3/0418* (2013.01); *G06F 3/03545* (2013.01); *G06F 3/04883* (2013.01); *G06F 2203/04107* (2013.01)

(58) Field of Classification Search
CPC ............... G06F 3/03545; G06F 3/0418; G06F 3/04883; G06F 2203/04107
See application file for complete search history.

(56) References Cited

U.S. PATENT DOCUMENTS 9,030,439 B2  5/2015  Chang et al.
9,134,849 B2  9/2015  Chang et al.
(Continued)

FOREIGN PATENT DOCUMENTS

CN    102789332 A    11/2012
CN    105068690 A    11/2015
(Continued)

OTHER PUBLICATIONS

International Search Report and Written Opinion from PCT/CN2021/080017 dated Jun. 9, 2021.

*Primary Examiner* — Michael Pervan
(74) *Attorney, Agent, or Firm* — Calfee, Halter & Griswold LLP

(57) ABSTRACT

The present disclosure relates to a data processing method and apparatus, and an intelligent interactive device. The data processing method is performed by a display having a touch function. The method include: obtaining a writing track point position when a writing pen writes on the display, and an inclination angle of the writing pen relative to the display during writing; obtaining a touch track point position of a user on the display at a current moment obtaining a holding parameter for holding the writing pen; determining a shielding area for a touch at the current moment according to the holding parameter, the inclination angle and the writing track point position; and when touch track point position is located in the shielding area, not displaying a track of the touch track point position on the display.

18 Claims, 5 Drawing Sheets

(56) References Cited

U.S. PATENT DOCUMENTS

| | | |
|---|---|---|
| 9,256,315 B2 | 2/2016 | Tsai et al. |
| 9,377,877 B2 | 6/2016 | Chang |
| 9,557,852 B2 | 1/2017 | Tsai et al. |
| 10,007,361 B2 | 6/2018 | Chang et al. |
| 10,019,077 B2 | 7/2018 | Yeh |
| 10,222,908 B2 | 3/2019 | Yeh |
| 10,345,928 B2 * | 7/2019 | Yeh ............... G06F 3/03545 |
| 10,809,819 B2 | 10/2020 | Chang et al. |
| 10,838,519 B2 | 11/2020 | Yeh |
| 2012/0293454 A1 | 11/2012 | Tsai et al. |
| 2013/0100074 A1 | 4/2013 | Chang et al. |
| 2013/0155013 A1 | 6/2013 | Chang et al. |
| 2013/0155014 A1 | 6/2013 | Yeh |
| 2013/0155015 A1 | 6/2013 | Chang |
| 2013/0155016 A1 | 6/2013 | Chang et al. |
| 2014/0022193 A1 | 1/2014 | Kim et al. |
| 2016/0110017 A1 | 4/2016 | Tsai et al. |
| 2017/0255283 A1 * | 9/2017 | Yeh ............... G06F 3/0418 |
| 2017/0255331 A1 | 9/2017 | Yeh |
| 2017/0309610 A1 | 10/2017 | Yao et al. |
| 2018/0275782 A1 | 9/2018 | Chang et al. |
| 2018/0292922 A1 | 10/2018 | Yeh |
| 2019/0033994 A1 | 1/2019 | Kim et al. |
| 2020/0243504 A1 | 7/2020 | Yao et al. |

FOREIGN PATENT DOCUMENTS

| | | |
|---|---|---|
| CN | 205121529 U | 3/2016 |
| CN | 106775404 A | 5/2017 |
| CN | 107153480 A | 9/2017 |
| CN | 108459757 A | 8/2018 |
| CN | 105068690 B | 10/2018 |
| CN | 110134320 A | 8/2019 |
| CN | 110377214 A | 10/2019 |
| CN | 110442264 A | 11/2019 |
| CN | 111580687 A | 8/2020 |
| EP | 2687954 A2 | 1/2014 |
| EP | 2687954 A3 | 10/2017 |
| WO | 2013/063241 A1 | 5/2013 |
| WO | 2017/031910 A1 | 3/2017 |

* cited by examiner

DATA PROCESSING METHOD AND APPARATUS, AND SMART INTERACTION DEVICE

CROSS REFERENCE OF RELATED APPLICATION(S)

This application is the 371 application of PCT Application No. PCT/CN2021/080017, filed Mar. 10, 2021, which claims priority to Chinese patent application No. 202010362845.0, filed on Apr. 30, 2020 and entitled "Data Processing Method, Device, and Intelligent Interactive Device", the entire contents of which are incorporated herein by reference in their entirety.

TECHNICAL FIELD

Embodiments of the present disclosure generally relate to the display technical field, and more particularly, to a data processing method and device and an intelligent inactive device.

BACKGROUND

With the development of science and technologies, many scenarios such as conferences, teaching, or commercial exhibition uses displays to replace traditional whiteboards, which can greatly improve the efficiency of work, teaching and conferences.

The current displays can be touched by a hand and a writing pen. In some scenarios, the hand and the pen can write at the same time. If the pen-holding hand touches or is very close to the displays, unnecessary touch traces will be generated, which will affect the written contents.

SUMMARY

An objective of the present disclosure is to provide a data processing method and device and an intelligent interactive device so as to at least overcome the above-mentioned deficiencies in related art that the pen-holding hand affects written contents.

In some embodiments of the present disclosure, there is provided a data processing method performed by a display having a touch function. The method includes:

obtaining a writing track point position when a writing pen writes on the display, and an inclination angle of the writing pen relative to the display when the writing pen writes on the display;

obtaining a touch track point position of a user on the display at a current moment;

obtaining a holding parameter for holding the writing pen; and determining a shielding area for a touch at the current moment according to the holding parameter, the inclination angle and the writing track point position, wherein the writing track point position is received at the current moment or within a set time period threshold earlier than the current moment;

wherein when touch track point position is located in the shielding area, a track of the touch track point position is not displayed on the display.

In an exemplary embodiment of the present disclosure, the holding parameter includes a distance between a pen-holding endpoint where a user holds the writing pen and a pen tip, and a radius of a fist shape.

In an exemplary embodiment of the present disclosure, determining the shielding area for the touch at the current moment according to the holding parameter, the inclination angle and the writing track point position includes:

determining an orthographic projection point of the pen-holding endpoint on the display according to the writing track point position, the inclination angle and the distance between the pen-holding endpoint and the pen tip; and determining the shielding area according to the radius of the fist shape and the orthographic projection point.

In an exemplary embodiment of the present disclosure, determining the orthographic projection point of the pen-holding endpoint on the display according to the writing track point position, the inclination angle and the distance between the pen-holding endpoint and the pen tip includes:

establishing a rectangular coordinate system with the writing track point position at the current moment as an origin, wherein a horizontal axis of the rectangular coordinate system is parallel to a sky side of the display, and a vertical axis of the rectangular coordinate system is perpendicular to the horizontal axis; and performing calculations according to the following formula:

$$\begin{cases} Dx = \pm L g \cos \alpha \\ Dy = -L g \cos \beta \end{cases},$$

where Dx is an abscissa value of the orthographic projection point in the rectangular coordinate system, Dy is an ordinate value of the orthographic projection point in the rectangular coordinate system, L is the distance between the pen-holding endpoint and the pen tip, $\alpha$ is an included angle between the writing pen and the horizontal axis, and $\beta$ is an included angle between the writing pen and the vertical axis.

In an exemplary embodiment of the present disclosure, before obtaining the touch track point position of the user on the display at the current moment, the method further includes:

obtaining a type of the pen-holding endpoint, wherein the type of the pen-holding endpoint is a second pen-holding endpoint or a first pen-holding endpoint, and a distance between the first pen-holding endpoint and the pen tip is smaller than a distance between the second pen-holding endpoint and the pen tip; and obtaining a shape of the shielding area, wherein the shape of the shielding area is a circle, an ellipse, a semicircle, a sector or a rectangle.

In an exemplary embodiment of the present disclosure, the pen-holding endpoint is the second pen-holding endpoint, and the shape of the shielding area is the circle, the semicircle or the sector;

wherein determining the shielding area according to the radius of the fist shape and the orthographic projection point includes:

determining that the shielding area is a circle, a semicircle or a sector with the orthographic projection point as a center and the radius of the fist shape as a radius.

In an exemplary embodiment of the present disclosure, the pen-holding endpoint is the first pen-holding endpoint, and the shape of the shielding area is the semicircle or the rectangle;

wherein determining the shielding area according to the radius of the fist shape and the orthographic projection point includes:

determining a boundary point of the shielding area according to the radius of the fist shape and the orthographic projection point;

determining a size determination value of the shielding area according to the boundary point and the writing track point position; and determining the shielding area according to the boundary point and the size determination value.

In an exemplary embodiment of the present disclosure, determining the boundary point of the shielding area according to the radius of the fist shape and the orthographic projection point includes:

the boundary point being located on an extension line of a connecting line for connecting the orthographic projection point and the writing track point position, wherein the extension line is an extension line with the orthographic projection point as a starting point, and a distance between the boundary point and the orthographic projection point does not exceed the radius of the fist shape.

In an exemplary embodiment of the present disclosure, the shape of the shielding area is the semicircle;

wherein determining the size determination value of the shielding area according to the boundary point and the writing track point position includes:

determining that the size determination value of the shielding area is a radius of the semicircle, wherein the radius is a distance between the writing track point position and the boundary point.

In an exemplary embodiment of the present disclosure, determining the shielding area according to the boundary point and the size determination value includes:

determining a semicircle with the boundary point as a center and away from the orthographic projection point as the shielding area.

In an exemplary embodiment of the present disclosure, the shape of the shielding area is the rectangle;

wherein determining the size determination value of the shielding area according to the boundary point and the writing track point position includes:

determining that the size determination value is a length and width of the rectangle, wherein the width is a distance between the writing track point position and the boundary point, and the length is n times the width, and n is a positive integer greater than or equal to 1.

In an exemplary embodiment of the present disclosure, determining the shielding area according to the boundary point and the size determination value includes:

determining that the boundary point is a center point of a long side of the rectangle, wherein the other long side of the rectangle is located on a side of the boundary point away from the orthographic projection point.

In an exemplary embodiment of the present disclosure, parameters of the pen-holding endpoint are pre-stored, and the parameters of the pen-holding endpoint includes a plurality of first pen-holding endpoint values or a plurality of second pen-holding endpoints values, and the first pen-holding endpoint values are less than the second pen-holding endpoint values;

a plurality of the pre-stored first pen-holding endpoint values are obtained, and a plurality of first sub-shielding areas are formed according to the plurality of first pen-holding endpoint values; and a range covered by the plurality of the first sub-shielding areas is determined the shielding for the touch at the current moment; or a plurality of the pre-stored second pen-holding endpoint values are obtained, and a plurality of second sub-shielding areas are formed according to the plurality of second pen-holding endpoint values; and a range covered by the plurality of the second sub-shielding areas is determined the shielding for the touch at the current moment.

In an exemplary embodiment of the present disclosure, the method further includes:

in response to a pen-lifting operation of the writing pen, obtaining a duration of the pen-lifting operation, and if the duration exceeds the set time period threshold, cancelling the shielding area for the touch.

In some embodiments of the present disclosure, there is provided a touch data processing device, including:

a first receiving module configured to obtain a writing track point position when a writing pen writes on a display, and an inclination angle of the writing pen relative to the display when the writing pen writes on the display;

a second receiving module configured to obtain a touch track point position of a user on the display at a current moment;

an obtaining module configured to obtain a holding parameter for holding the writing pen;

a determination module configured to determine a shielding area for a touch at the current moment according to the holding parameter, the inclination angle and the writing track point position, wherein the writing track point position is received at the current moment or within a set time period threshold earlier than the current moment; and a processing module configured to, when touch track point position is located in the shielding area, not display a track of the touch track point position on the display.

In some embodiments of the present disclosure, there is provided an intelligent interactive device, including:

a display with a touch function, wherein the display is used to receive a touch track point position of a user, a writing track point position of a writing pen and an inclination angle of the writing pen relative to the display when the writing pen writs on the display, and provide the touch track point position, the writing track point position and the inclination angle to a processor; and the processor configured to perform processing according to the data processing method according to any one of the above embodiments and perform displaying on the display.

In an exemplary embodiment of the present disclosure, the intelligent interactive device further includes:

a writing pen configured to write on the display, and capable of detecting the inclination angle of the writing pen and transmitting the inclination angle to the processor.

BRIEF DESCRIPTION OF THE DRAWINGS

The accompanying drawings, which are incorporated in and constitute a part of the description, illustrate embodiments consistent with the disclosure and serve to explain principles of the disclosure together with the description. Obviously, the drawings in the following description are only some embodiments of the present disclosure, and for those of ordinary skill in the art, other drawings can be obtained from these drawings without creative effort.

DETAILED DESCRIPTION

Figure 1:
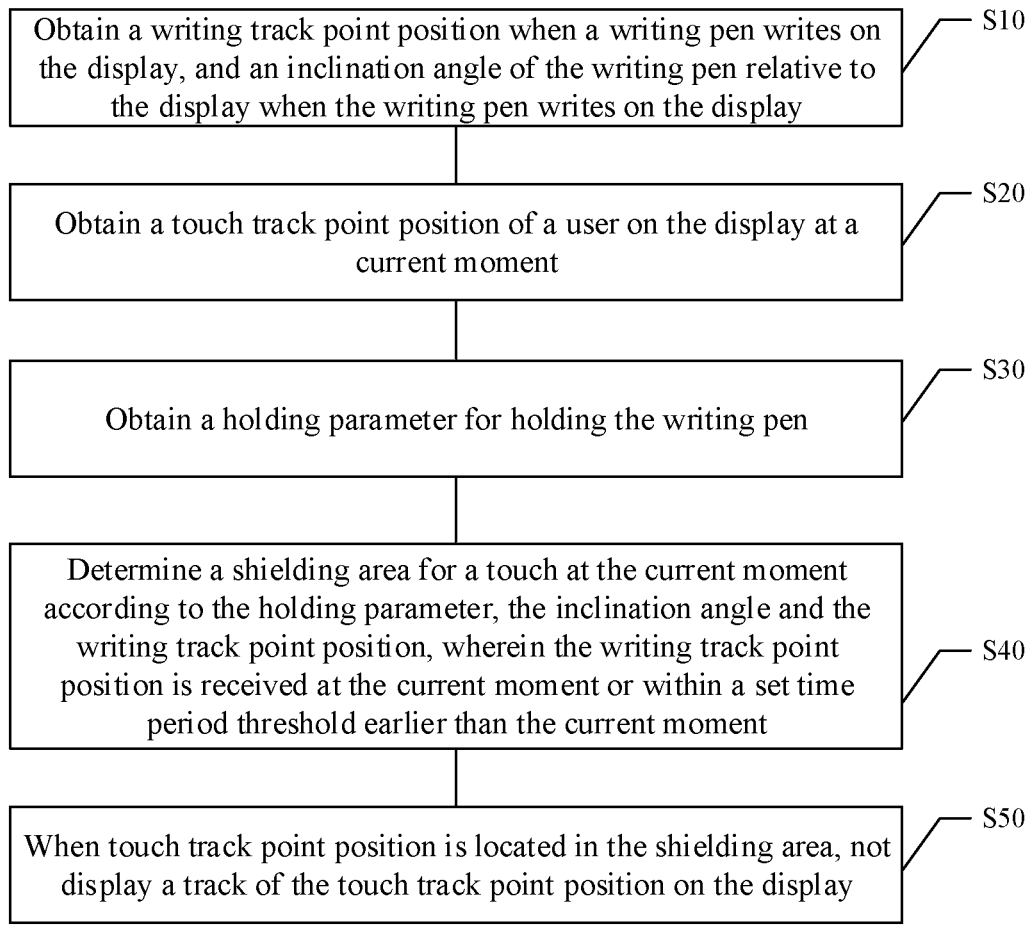
FIG. 1 schematically shows a flowchart of a data processing method according to an embodiment of the present disclosure.

Based on the objective, technical solutions and effects of the present disclosure, the following different embodiments are proposed to illustrate the objective of the present disclosure more clearly. Example embodiments will now be described more clearly with reference to the accompanying drawings. Example embodiments, however, can be embodied in various forms and should not be construed as limited to the examples set forth herein. The described features, structures, or characteristics may be combined in any suitable manner in one or more embodiments. In the following description, numerous specific details are provided in order to give a thorough understanding of embodiments of the present disclosure. However, those skilled in the art will appreciate that the technical solutions of the present disclosure may be practiced without one or more of the specific details, or other methods, components, devices, steps, etc. may be employed. In other situations, well-known solutions are shown or described in detail to avoid obscuring aspects of the present disclosure.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

The data processing method according to embodiments of the present disclosure is applicable to a display 2 with a touch function. A user may touch the display 2 by a finger or by a writing pen 1. The display 2 may be operated by a single person, for example, in a teacher's explanation stage in a teaching process, an individual speaking stage in a meeting, a one-person explanation stage in a commercial presentation, and so on. Alternatively, the display 2 may be operated by multiple persons, for example, a multiple-student writing stage in a teaching process, a group discussion stage in a meeting, and multi-person explanation stage in a commercial presentation, etc. In the multi-person operations, some users may use the writing pen 1 to operate, while other users may perform operations with fingers. Thus, it is impossible to shield a finger operation during the operation of the writing pen. However, it is needed to avoid false touches by the fingers of the users who operate with the writing pen. The data processing method is suitable for when the display 2 displays a writing page, and of course, the display 2 can also be used when the display 2 displays a touch page.

The display 2 may include one or more of electromagnetic touch, resistive touch, infrared touch and capacitive touch.

The writing pen 1 is used for writing and touching on the display. The writing pen 1 may be either electromagnetic or capacitive. When the writing pen 1 is an electromagnetic type, the display 2 needs to include an electromagnetic touch module; when the writing pen 1 is a capacitive type, the display 2 needs to include a capacitive touch module. Finger touch can be achieved in a different way than the writing pen.

An exemplary embodiment first provides a data processing method. Referring to FIG. 1, the data processing method may include the following steps:

In step S10, a writing track point position A when the writing pen 1 writes on the display 2, and an inclination angle of the writing pen 1 relative to the display 2 when the writing pen 1 writes on the display 2 are obtained.

In step S20, a touch track point position of a user on the display 2 at a current moment.

In step S30, a holding parameter for holding the writing pen 1 is obtained.

In step S40, a shielding area M for a touch at the current moment is determined according to the holding parameter, the inclination angle and the writing track point position A. The writing track point position A is received at the current moment or within a set time threshold period earlier than the current moment.

In step S50, when touch track point position is located in the shielding area M, a track of the touch track point position is not displayed on the display.

According to the data processing method in the exemplary embodiment, the shielding area M for the touch at the current moment can be automatically calculated according to the holding parameter, the inclination angle and the writing track point position A, and there is no need to input the shielding area information in advance. Thus, the hand holding the pen does interfere with the written contents.

Next, the data processing method according to the exemplary embodiment will be further described.

In step S10, the writing track point position A when the writing pen 1 writes on the display 2, and the inclination angle of the writing pen 1 relative to the display 2 when the writing pen 1 writes on the display 2 are obtained.

Figure 5:
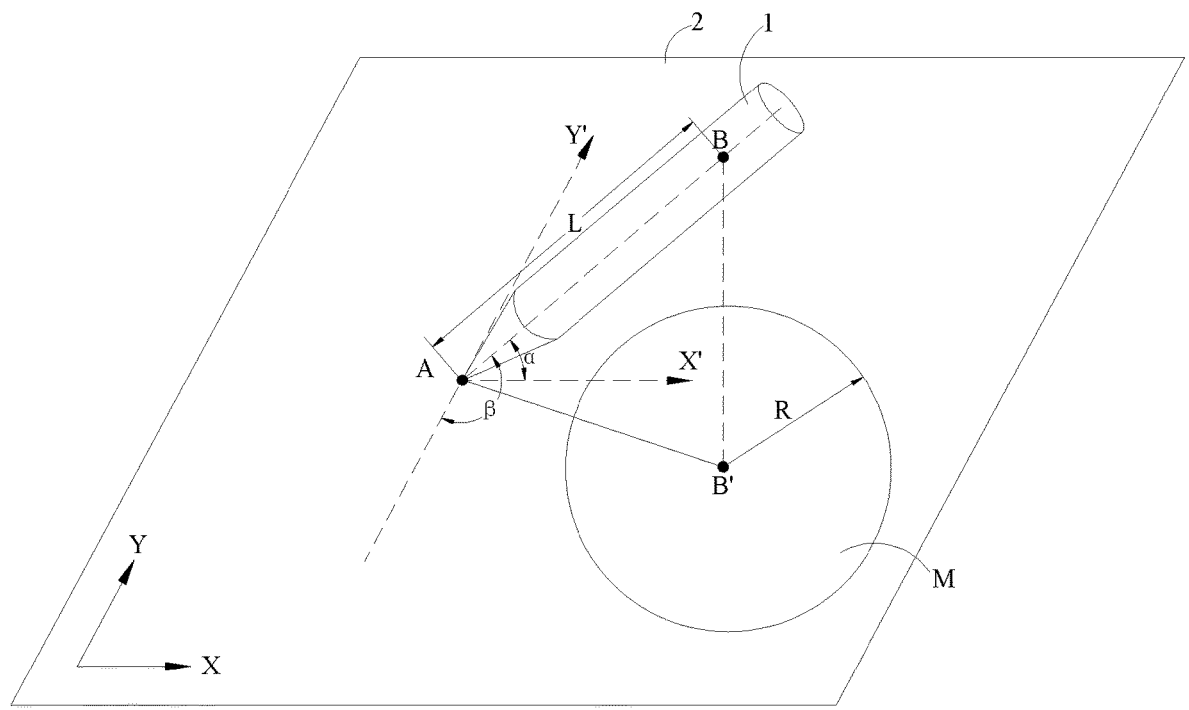
FIG. 5 schematically shows a structure diagram of determination of a circular shielding area when the pen is held by a right hand.

Referring to FIG. 5, in some embodiments of the present disclosure, a static rectangular coordinate system may be established with the pixel point at the lower left corner of the display area of the display 2 with a touch function as the origin. The static horizontal axis of the static rectangular coordinate system is parallel to the ground side (or sky side) of the display area of the display 2. The static vertical axis Y of the static rectangular coordinate system is perpendicular to the static horizontal axis X. The straight line formed by the left edge of the display area of the display 2 may be set as the static vertical axis. A straight line parallel to the static horizontal axis and passing through the writing track point position A may be a first reference line L1, and a straight line parallel to the static vertical axis and passing through the writing track point position A may be a second reference line L2. Taking the edge of the display area of the display 2 as the coordinate axis is convenient for subsequent calculations. The establishment of the static rectangular coordinate system is applicable to the rectangular display 2. It may be understood that the coordinate system can also be established with the upper left corner, upper right corner, or lower right corner points as the origin. The establishment of the coordinate system for the display 2 of other shapes can also be set in this way. Or, the coordinate system may be established in some other way as required, for example, any corner may be selected as the coordinate origin, and an edge passing through the origin may be used as the abscissa or ordinate.

The writing pen 1 may be an electromagnetic pen, and correspondingly the display 2 is a touch display having an electromagnetic induction function. When the writing pen 1 writes on a writing whiteboard, the writing track point position A on the writing whiteboard is the position of each point on a track formed by the writing pen 1 touching the display 2 when the writing pen 1 writes on or touches the writing whiteboard. The writing track point position A may be a coordinate value of a contact point between the writing pen 1 and the display 2 in the above-mentioned static rectangular coordinate system, and a plurality of coordinate values form the writing track.

Figure 2:
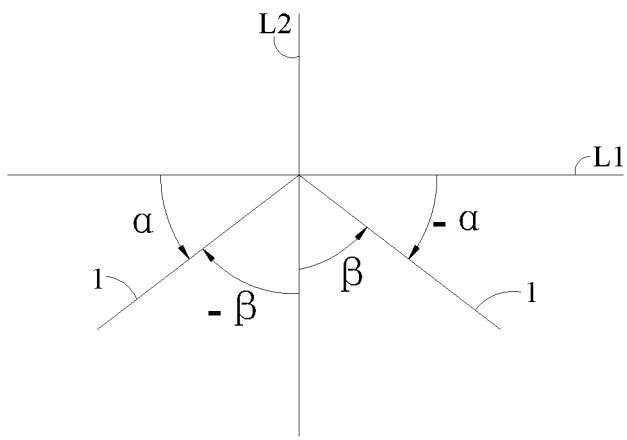
FIG. 2 schematically shows a top view when a writing pen is held in a left hand and the writing pen is held in a right hand.

FIG. 2 is a schematic top view when the writing pen is held by a left hand and the writing pen is held by a right hand. Referring to FIG. 2, the inclination angle of the writing pen 1 includes a spatial solid angle α between a central axis of the writing pen 1 and the first reference line L1 and a spatial solid angle β between the central axis of the writing pen 1 and the second reference line L2. The angle formed by a counterclockwise rotation relative to the first reference line L1 or the second reference line L2 is called a positive angle, and the angle formed by a clockwise rotation relative to the first reference line L1 or the second reference line L2 is called a negative angle. When the angle β between the central axis of the writing pen 1 and the second reference line L2 is a positive angle, it is determined that the writing pend is held by a right hand; when the angle β between the central axis of the writing pen 1 and the second reference line L2 is a negative angle, it is determined that the writing pend is held by a left hand. Alternatively, when the angle α between the central axis of the writing pen 1 and the first reference line L1 is a positive angle, it is determined that the writing pend is held by a left hand; when the angle α between the central axis of the writing pen 1 and the first reference line L1 is a negative angle, it is determined that the writing pen is held by a right hand. The values of α and β are greater than −90° and less than 90°.

The method for detecting the inclination angle according to some embodiments of the present disclosure may include providing an amplifying circuit and a detection instrument such as an N-axis gyroscope or a gravity sensing component in the pen.

The above-mentioned pen according to embodiments of the present disclosure may be an active pen. The active pen is provided with a gravity sensing portion, an amplifying circuit connected with an output end of the gravity sensing portion, and a signal emitting portion connected with an output end of the amplifying circuit. Based on the principle of gravity sensing, the angle between the active pen and the horizontal plane results in a change of a signal output, that is, the output signal changes with the change of the inclination angle of the pen. The angle with the horizontal plane is determined by the gravity sensing portion. According to some embodiments of the present disclosure, the writing pen may be an infrared pen. In this case, the corresponding display 2 is a touch display with an infrared sensing function. The writing pen 1 is provided with an inclination detection circuit, and the inclination detection circuit may detect the inclination angle of the writing pen 1 and transmit the inclination angle to the processor.

In step S20, a touch track point position of a user on the display at a current moment is obtained.

In an exemplary embodiment, the user is a user holding the writing pen, for example, the user uses his hand or foot to hold the pen, or a robot uses its hand to hole the pen.

The touch track point position is the position of each point on the track formed by the contact between a finger and the display 2 when the user writes on or touches the display 2 with the finger. The touch track point position may be a coordinate value of the contact point between the finger and the display 2 in the above-mentioned static rectangular coordinate system, and a plurality of coordinate values form the touch track.

In addition, in an exemplary embodiment, the data processing method may further include: in response to a pen-lifting operation of the writing pen, obtaining a duration of the pen-lifting operation; if the duration exceeds the set time period threshold, cancelling a shielding function for the shielding area; and if the duration does not exceed the set time period threshold, maintaining the shielding function for the shielding area.

Specifically, implementations may be as follows. While receiving the touch track point position, whether the writing track point position A is received may be detected. That is, when receiving the touch signal of the finger, whether there is a writing pen 1 which is performing a writing operation at the same time may be determined, that is, whether the user has a pen-lifting operation is determined. If the writing track point position A is not received, it means that that there is a pen-lifting operation.

After receiving the touch track point position of the user at the current moment, touch data processing may be performed according to whether the writing track point position A is detected. For example, if the writing track point position A is not received, a difference between the current moment when receiving the touch track point position and the last moment when the writing track point position A was last received is calculated. The difference is compared with the set time period threshold. If the difference is greater than the set time period threshold, the setting of the shielding area M is not performed; if the difference is less than the set time period threshold, the setting of the shielding area M is performed next.

In an exemplary embodiment, the set time period threshold is an effective time period for the writing pen 1 to lift off when the writing pen 1 is performing input. The set time period threshold is in the order of tens of milliseconds. When the user performing input with the writing pen 1, the user may lift off the display 2 for a short time. If a finger or a non-writing pen touches the display 2 during the short lift-off time, the shielding area M still needs to be set. This setting can provide a certain time delay for preventing false touches, so as to achieve a better effect of preventing false touches.

In step S30, a holding parameter for holding the writing pen 1 is obtained.

In an exemplary embodiment, the holding parameter may include a parameter indicating the holding of the pen by the user. Exemplarily, the pen-holding parameter may be a distance between a position farthest from the pen tip among positions where the pen is held by the user and the pen tip. Exemplarily, the holding parameter may include a distance between a pen-holding endpoint where a user holds the writing pen 1 and a pen tip, and a radius R of a fist shape. Both the pen-holding endpoint and the radius R of the fist shape are stored in a memory in advance. The pen-holding parameters may be set in a memory in the pen, or may be set on an intelligent display device, or touch display device or the like that interacts with the pen.

The pen-holding endpoint may include a first pen-holding endpoint D and a second pen-holding endpoint B. The first pen-holding endpoint D is a contact point between the user's pen-holding hand and the writing pen 1, and is the closest contact with the pen tip of the writing pen 1. The value of the first pen-holding endpoint is the distance between the first pen-holding endpoint D and the pen tip. The second pen-holding endpoint B is also a contact point between the user's pen-holding hand and the writing pen 1, and is the farthest contact point with the pen tip of the writing pen 1. The value of the second holding pen endpoint is the distance between the second holding pen endpoint B and the pen tip. The radius R of the fist shape is the radius of a circumcircle of a fist formed after the user makes a fist when the user holds the pen while writing.

The distance between the first pen-holding endpoint D and the pen tip of the writing pen 1 is greater than or equal to 2.5 cm and less than or equal to 3.5 cm. In the subsequent calculations, the radial size of the writing pen 1 can be ignored, that is, the writing pen 1 is marked as an inclined straight line (the central axis of the writing pen 1), and the first and second pen-holding endpoints D and B are located on the inclined line (on the central axis of the writing pen 1). The radius R of the fist shape is about 4 cm to 5 cm. The values of pen-holding endpoints and the radiuses R of the fist shape and their corresponding relationship are also set in the processor. The user can select corresponding values before use. After selection, the processor may obtain the pen-holding parameter for holding the writing pen 1 from the memory. The values of the pen-holding endpoints and the radiuses R of the fist shape may correspond to each other. Different pen-holding endpoints and radiuses R of the fist shape can be set according to different pen types. For example, the values of the first pen-holding endpoint and the radius R of the fist shape for children's pen are relatively small, the value of the first pen-holding endpoint is greater than or equal to 2.5 cm and less than or equal to 3 cm, and the radius R of the fist shape is about 4 cm. The values of the first pen-holding endpoint and the radius R of the fist shape for adult's pen are relatively large, the value of the first pen-holding endpoint is greater than or equal to 3 cm and less than or equal to 3.5 cm, and the radius R of the fist shape is about 5 cm. In addition, the type of writing pen 1 can also be set as female and male adult pens.

The distance between the second pen-holding endpoint B and the pen tip of the writing pen 1 is greater than or equal to 6.5 cm and less than or equal to 8.5 cm. For example, the values of the second pen-holding endpoint and the radius R of the fist shape for children's pen are relatively small, the value of the second pen-holding endpoint is greater than or equal to 6.5 cm and less than or equal to 7.5 cm, and the radius R of the fist shape is about 4 cm. The values of the second pen-holding endpoint and the radius R of the fist shape for adult's pen are relatively large, the value of the second pen-holding endpoint is greater than or equal to 7.5 cm and less than or equal to 8.5 cm, and the radius R of the fist shape is about 5 cm. Various types of writing pens 1 are provided, and the user can select the type of writing pens 1 in advance in order to improve the accuracy of the shielding area M. Of course, the values of the pen-holding endpoint and the radius R of the fist shape can also be set to only one case, and the user does not need to perform selection before use, and the values can be directly called from the memory.

In step S40, a shielding area for a touch at the current moment is determined according to the holding parameter, the inclination angle and the writing track point position. The writing track point position is received at the current moment or within a set time period threshold earlier than the current moment.

The determination modes of the shielding area M may include the following three modes: determining the shielding area M according to the second pen-holding endpoint B with the shape of the shielding area M being a circle, a semicircle or a sector; determining the shielding area M according to the first pen-holding endpoint D with the shape of the shielding area M being a semicircular; or determining the shielding area M according to the first pen-holding endpoint D with the shape of the shielding area M being a rectangle. The determination mode of the shielding area M can be set as one mode or multiple modes before the display 2 leaves the factory. In the case of only one mode, the user does not need to select it before use; in the case of multiple modes, the user needs to perform mode selection before use, that is, the user needs to input the first pen-holding endpoint D or the second pen-holding endpoint B which is to be used, and the shape of the shielding area M may be selected as a rectangle, a semicircle or a circle. In a case where the second pen-holding end point B is selected, the corresponding shape of the shielding area M is a circle, a semicircle or a sector. In a case where the first pen-holding endpoint D is selected, the corresponding shape of the shielding area M is generally a semicircle or a rectangle, and it is needed to choose from a semicircle or a rectangle. After the user performs selection, the processor acquires the user's selection, that is, the processor determines that the pen-holding endpoint is the second pen-holding endpoint or the first pen-holding endpoint, and the processor obtains the shape of the shielding area M as a circle, a semicircle, a sector, a semicircle or a rectangle, and then the processor proceeds to the next step.

Figure 3:
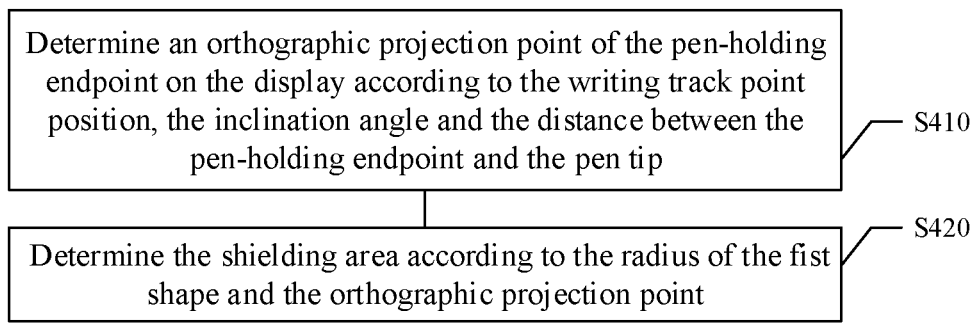
FIG. 3 schematically shows a flowchart of determination of a shielding area according to an example implementation.

Referring to FIG. 3, step S40 may specifically include the following steps:

In step S410, an orthographic projection point of the pen-holding endpoint on the display is determined according to the writing track point position A, the inclination angle and the distance between the pen-holding endpoint and the pen tip.

Figure 6:
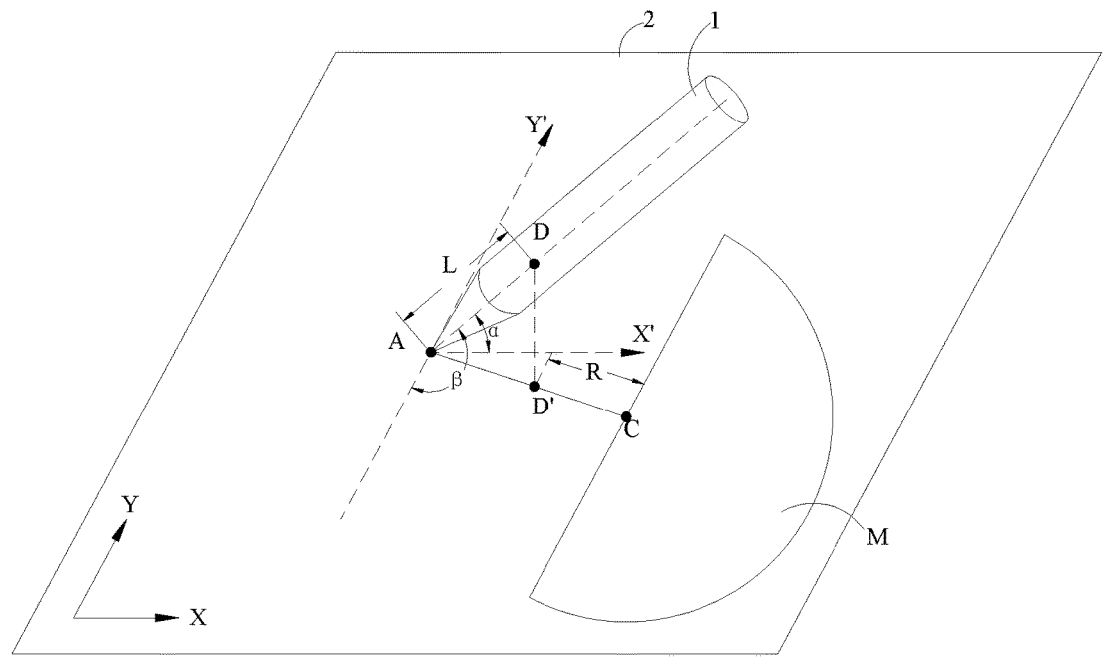
FIG. 6 schematically shows a structure diagram of determination of a semicircular shielding area when the pen is held by a right hand.

In an exemplary embodiment, referring to FIG. 6, taking a situation where the pen is held by a right hand as an example, a rectangular coordinate system may be established with the writing track point position A at the current moment as the origin. The horizontal axis X' of the rectangular coordinate system is parallel to an edge of the display 2, i.e., the horizontal axis X' of the rectangular coordinate system is parallel with the static horizontal axis X of the static rectangular coordinate system. The first reference line L1 is the horizontal axis. The vertical axis Y' of the rectangular coordinate system is perpendicular to the horizontal axis X', that is, the vertical axis Y' of the rectangular coordinate system is parallel to the static vertical axis Y of the static rectangular coordinate system. The second reference line L2 is the vertical axis.

Then, calculations are performed according to the following formula:

$$\begin{cases} Dx = \pm Lg\cos\alpha \\ Dy = -Lg\cos\beta \end{cases},$$

where Dx is an abscissa value of the orthographic projection point D' in the rectangular coordinate system, Dy is an ordinate value of the orthographic projection point D' in the rectangular coordinate system, L is the distance between the pen-holding endpoint D and the pen tip, α is an included angle between the writing pen 1 and the horizontal axis X', and β is an included angle between the writing pen 1 and the vertical axis Y'.

For a situation where the pen is held by a right hand, the above formula may be:

$$\begin{cases} Dx = Lg\cos\alpha \\ Dy = -Lg\cos\beta \end{cases}.$$

For a situation where the pen is held by a left hand, the above formula may be:

$$\begin{cases} Dx = -Lg\cos\alpha \\ Dy = -Lg\cos\beta \end{cases}.$$

The orthographic projection point D' (Dx, Dy) can be converted into the static rectangular coordinate values according to the writing track point position A. For example, the coordinates of the touch track point position A are (Ax, Ay), and the coordinates can directly use as pixel coordinates. The pixel density of the display 2 is PPI, and the orthographic projection point is D'(Ax+Dx*PPI, Ay+Dy*PPI). Specifically, the orthographic projection point for the situation where the pen is held by a left hand is D' (Ax+|Dx*PPI|, Ay−|Dy*PPI|), and the orthographic projection point for the situation where the pen is held by a right hand is D'(Ax−|Dx*PPI|, Ay−|Dy*PPI|). For the subsequent conversion of the boundary point C and shielding area to specific pixel points and pixel areas, the conversion rule is to multiply the actual size by the pixel density PPI.

Of course, the orthographic projection point B' of the second pen-holding endpoint B on the display is also determined by the above method.

In step S420, the shielding area is determined according to the radius R of the fist shape and the orthographic projection point.

In an exemplary embodiment, referring to FIG. 5, the user selects the second pen-holding endpoint as the pen-holding endpoint, and a circular as the shape of the shielding area M. The processor determines that the shielding area M is a circle whose center is the orthographic projection point B' of the second pen-holding endpoint and whose radius is the radius R of the fist shape.

Of course, the shape of the shielding area M can also be selected to be a semicircle or a sector, and the semicircle or sector is a part of the above-mentioned circle, and is located on a side of the center of the circle away from the writing track point position A, and the central angle of the sector is greater than 180 degrees.

Figure 4:
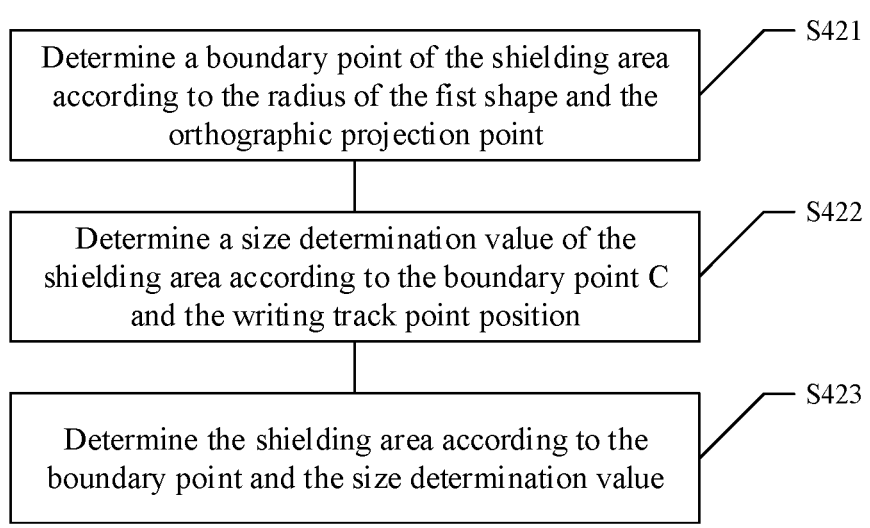
FIG. 4 schematically shows a flowchart of determination of the shielding area according to another example implementation.

In other example implementations, the user may select the first pen-holding endpoint as the pen-holding endpoint, and the corresponding shielding area is a semicircle or a rectangle. In this case, referring to FIG. 4, the step S420 of determining the shielding area M according to the radius R of the fist shape and the orthographic projection point may further include the following steps:

In step S421, a boundary point of the shielding area is determined according to the radius of the fist shape and the orthographic projection point.

Referring to FIG. 6, the boundary point C is a point of the shielding area M, that is, the shielding area M may be determined according to this point. The boundary point C is located on an extension line of the orthographic projection point D' and the writing track point position A, the extension line is an extension line with the orthographic projection point D' as a starting point, and a distance between the boundary point C and the orthographic projection point D' is the radius R of the fist shape, which is converted to pixels as R*PPI.

In step S422, a size determination value of the shielding area M is determined according to the boundary point C and the writing track point position A.

In an example implementation, referring to FIG. 6 again, the user has selected the shielding area M as a semicircle, it is determined that the size determination value of the shielding area N is a radius of the semicircle, and the radius is a distance between the writing track point position A and the boundary point C, i.e., the length of the line segment AC in FIG. 6.

Figure 7:
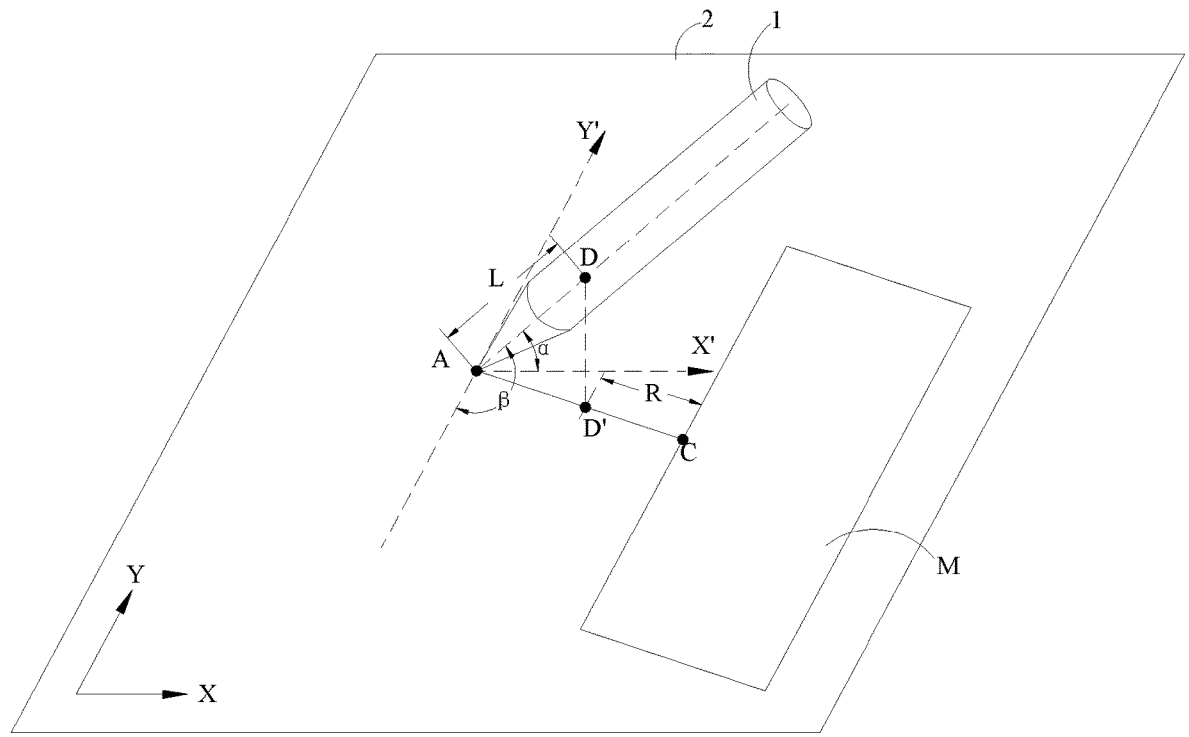
FIG. 7 schematically shows a structure diagram of determination of a rectangular shielding area when the pen is held by a right hand.

In other example embodiments of the present disclosure, referring to FIG. 7, the user can also select the shielding area M as a rectangle, it is determined that the size determination value of the shielding area M is a length and width of the rectangle. The width is a distance between the writing track point position A and the boundary point C, i.e., the length of the line segment AC in FIG. 7, and the length is twice the width. Of course, the length may be n times the width, where n is a positive integer greater than or equal to 1, and the value of n may be determined as required.

In step S423, the shielding area M is determined according to the boundary point C and the size determination value.

In an example implementation, referring to FIG. 6 again, the user has selected the shielding area M to be a semicircle. In this case, a semicircle with the boundary point C as the center and away from the orthographic projection point D' may be determined as the shielding area M. The diameter edge of the semicircular shielding area M is perpendicular to the connecting line AC which connects the boundary point C and the writing track point position A, that is, the diameter edge of the semicircular shielding area M is perpendicular to the connecting line which connecting the boundary point C and the orthographic projection point D'.

In other example embodiments of the present disclosure, referring to FIG. 7 again, the user may select the shielding area M to be a rectangle. In this case, the boundary point C may be determined as the center point of one long side of the rectangle, and the other long side is located on a side of the coordinates of the boundary point C away from the orthographic projection point D', and the long sides of the shielding area M are perpendicular to the connecting line AC which connects the boundary point C and the writing track point position A, that is, the long sides of the shielding area M are perpendicular to the connecting line CD' which connects the boundary point C and the orthographic projection point D'.

In addition, the shielding area M can also be elliptical, the long axis of the ellipse is the same as the length of the rectangle, the short axis of the ellipse is the same as the width of the rectangle, and the boundary point C is an endpoint of the short axis of the ellipse, and the long axis of the ellipse is perpendicular to the connecting line which connects the boundary point and the orthographic projection point.

It should be noted that, because the pre-stored parameter of the pen-holding endpoint (that is, the distance between the pen-holding endpoint and the pen tip of the writing pen 1)

is an interval value, that is, the parameter of the pen-holding endpoint includes a plurality of first pen-holding endpoint values or a plurality of second pen-holding endpoint values. The first pen-holding endpoint values are distances between the first pen-holding endpoint and the pen tip, and the second pen-holding endpoint values are distances between the second pen-holding endpoint and the pen tip.

Since the inclination angle of the writing pen 1 at a moment is only one and the radius R of the fist shape is constant, the distances between the boundary points of multiple sub-shielding areas and the orthographic projection points are increased as the distances between the pen-holding endpoints and the pen tip of the writing pen 1 increase. That is, the greater a distance between a pen-holding endpoint and the pen tip of the writing pen 1, the greater a distance between the boundary point of a sub-shielding area and the orthographic projection point. Accordingly, the size determination values of multiple sub-shielding areas are increased as the distances between the pen-holding endpoints and the pen tip of the writing pen 1 increase. That is, the greater a distance between a pen-holding endpoint and the pen tip of the writing pen 1, the larger the size determination value of a sub-shielding area. Therefore, a plurality of first sub-shielding areas are formed according to the plurality of first pen-holding endpoint values, and a plurality of second sub-shielding areas are formed according to the plurality of second pen-holding endpoint values.

Figure 8:
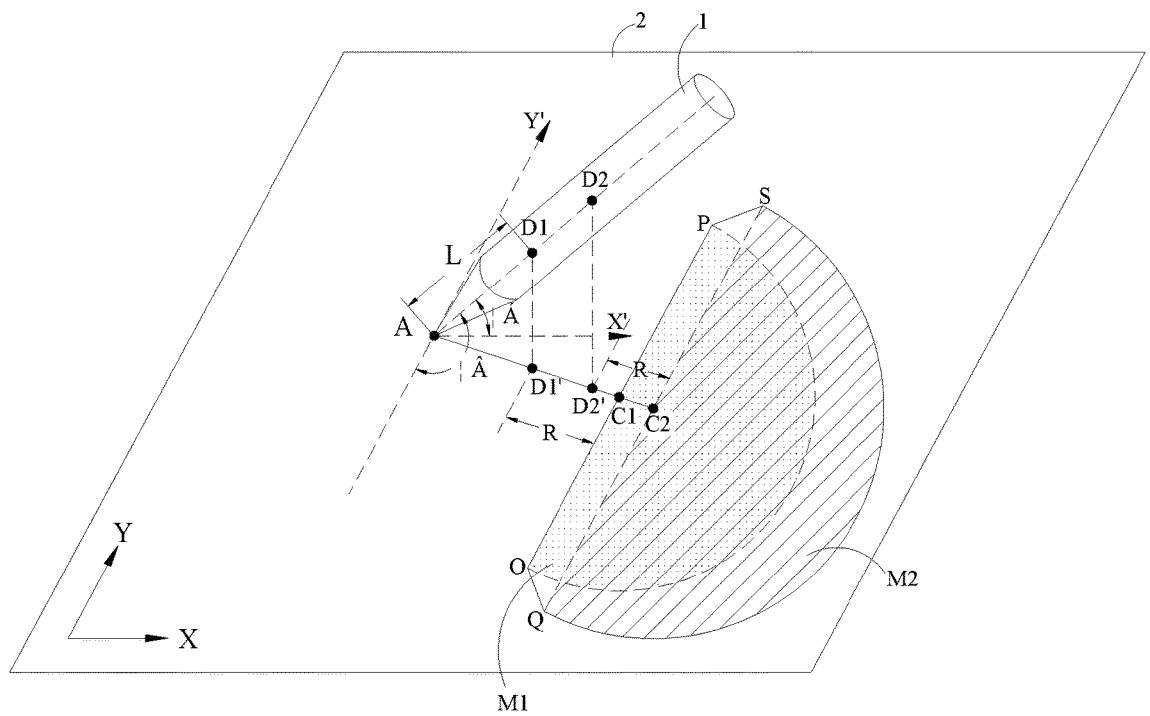
FIG. 8 schematically shows a structural diagram of determination of the union of semicircular sub-shielding areas when the pen is held by a right hand.

In this case, the shielding area M is an area covered by the plurality of first sub-shielding areas, or the shielding area M is an area covered by the plurality of second sub-shielding areas. Specifically, when the distance between the first pen-holding endpoint D and the pen tip of the writing pen 1 is the smallest, the shielding area M is the minimum shielding area M1. When the distance between the first pen-holding endpoint D and the pen tip of the writing pen 1 is the greatest, the shielding area M is the maximum shielding area M2. Referring to FIG. 8, the orthographic projection of the nearest first pen-holding endpoint D1 on the display 2 is the nearest orthographic projection point D1', and correspondingly the nearest boundary point C1 and the minimum shielding area M1 are formed. The orthographic projection of the farthest first pen-holding endpoint D2 on the display 2 is the farthest orthographic projection point D2', and correspondingly the farthest boundary point C2 and the maximum shielding area M2 are formed. When the shielding area M is selected as a semicircle, the shielding area M may be a union of a trapezoidal area and the maximum shielding area, and the trapezoidal area is formed by connecting lines ((line segment OQ and line segment PS) for connecting two end points (O, P) of the diameter edge of the minimum shielding area M1 and two end points (Q, S) of the diameter edge of the maximum shielding area M2, the diameter edge (the line segment OP) of the minimum shielding area M1, and the diameter edge (the line segment QS) of the maximum shielding area M2.

Figure 9:
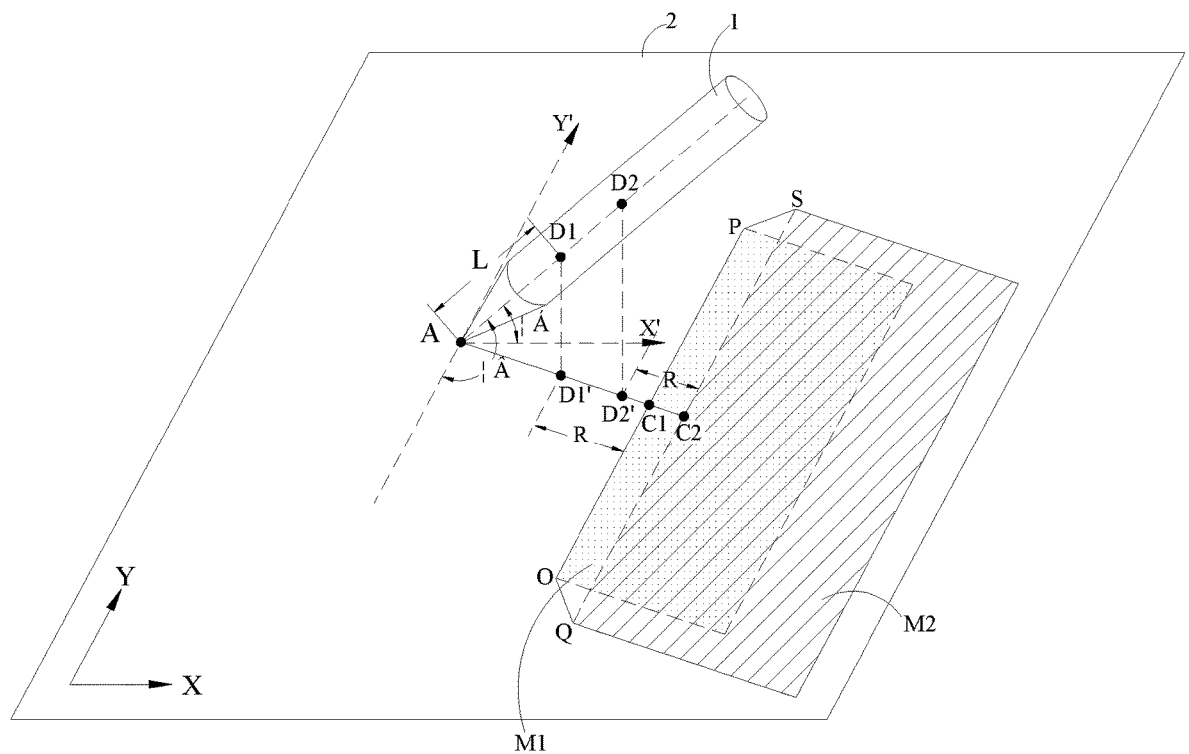
FIG. 9 schematically shows a structural diagram of determination of the union of rectangular sub-shielding areas when the pen is held by a right hand.

Referring to FIG. 9, the orthographic projection of the nearest first pen-holding endpoint D1 on the display 2 is the nearest orthographic projection point D1', and correspondingly the nearest boundary point C1 and the minimum shielding area M1 are formed. The orthographic projection of the farthest first pen-holding endpoint D2 on the display 2 is the farthest orthographic projection point D2', and correspondingly the farthest boundary point C2 and the maximum shielding area M2 are formed. When the shielding area M is selected as a rectangle, the shielding area M may be a union of a trapezoidal area and the maximum shielding area, and the trapezoidal area is formed by connecting lines ((line segment OQ and line segment PS) for connecting two end points (O, P) of a long side of the minimum shielding area M1 close to the orthographic projection point and two end points (Q, S) of a long side of the maximum shielding area close to the orthographic projection point, the long side (line segment OP) of the minimum shielding area M1 close to the orthographic projection point, and the long side (line segment QS) of the maximum shielding area close to the orthographic projection point.

In step S50, when touch track point position is located in the shielding area, a track of the touch track point position is not displayed on the display.

In an example embodiment, the touch track point position being located in the shielding area means that the touch track point position is located within the shielding area or on an edge of the shielding area. The track of the touch track point position is not displayed on the display, and no corresponding action is performed.

It should be noted that, after receiving the pen touch operation of the writing pen 1, a corresponding operation is performed according to the pen touch data of the pen touch operation.

In addition, while receiving the touch track point position of the user at the current moment, an initial point position of the touch track point position can also be recorded. When the initial point position is within the shielding area and a subsequent touch track point position is outside the shielding area, the track of the touch track point position is not displayed on the display 2. This situation usually occurs when the user changes the posture of holding the pen and touches the display. For example, the user writes with the writing pen 1 for a long time, and changes the posture of holding the pen when his/her hand is tired, or changes the posture of holding the pen when the user is thinking. Of course, this situation may occur in the case of multiple people perform writing. For example, a teacher and students are writing at the same time, and the teacher's writing is used as the main writing. If a student accidentally writes in the teacher's shielding area and extends beyond the shielding area, the student's writing track is not displayed on the display.

When the initial point position is outside the shielding area and a subsequent touch track point position is within the shield area, the track of the touch track point position is displayed on the display. This situation often occurs in the case where multiple people perform writing. When one user is writing, another user is also writing. For example, in a multi-person drawing scene, two users want to draw the same picture, resulting in a small operating area distance between the two users. When the first user is drawing, the part that the second user needs to draw may be in the shielding area of the first user. At this time, the drawing of the second user cannot be shielded as interference.

Specifically, in the above-mentioned situation, the positions of multiple touch track points generally form a line instead of a single touch point operation. For example, a user is writing or drawing with the writing pen 1, and another user draws a line on the display 2 with his finger. The starting position of the line is in the shielding area and another part of the line is outside the shielding area, and the track of the touch track point position for this line is not displayed on the display. Another situation is that a user is writing or drawing with the writing pen 1, and another user draws a line on the display 2 with his finger, the starting position of the line is outside the shielding area, and another part of the line is located in the shielding area. The track of the touch track point position is displayed on the display.

Additionally, although various steps of the methods of the present disclosure are depicted in the figures in a particular order, this does not require or imply that the steps must be performed in the particular order or that all illustrated steps must be performed to achieve the desired result. Additionally or alternatively, certain steps may be omitted, multiple steps may be combined into one step, and/or one step may be decomposed into multiple steps, and the like.

Figure 10:
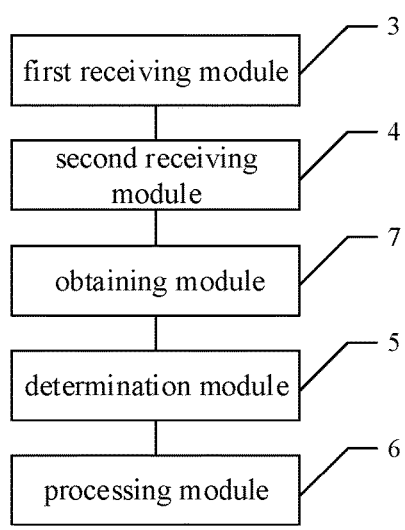
FIG. 10 schematically shows a block diagram of a touch data processing device.

Further, an exemplary embodiment further provides a touch data processing device corresponding to the above data processing method. Referring to FIG. 10, the touch data processing device may include a first receiving module 3, a second receiving module 4, an obtaining module 7, a determination module 5 and a processing module 6. The first receiving module 3 may be configured to obtain a writing track point position when a writing pen writes on a display, and an inclination angle of the writing pen relative to the display when the writing pen writes on the display. The second receiving module 4 may be configured to obtain a touch track point position of a user on the display at a current moment. The obtaining module 7 may be configured to obtain a holding parameter for holding the writing pen. The determination module 5 may be configured to determine a shielding area for a touch at the current moment according to the holding parameter, the inclination angle and the writing track point position, wherein the writing track point position is received at the current moment or within a set time period threshold earlier than the current moment. The processing module 6 may be configured to, when touch track point position is located in the shielding area, not display a track of the touch track point position on the display.

The specific details of each module in the above-mentioned touch data processing device have been described in detail in the corresponding virtual object data processing method, and therefore repeated descriptions will be omitted here.

Further, an exemplary embodiment further provides an intelligent interactive device, which may include a display 2, a processor, and a writing pen 1. The display 2 has a touch function, and the display 2 is configured to receive the touch track point position of a user, the writing track point position of the writing pen 1 and the inclination angle of the writing pen 1 relative to the display 2 when writing, and provide the touch track point position, the writing track point position and the inclination angle of the writing pen 1 to the processor. The processor is configured to perform processing according to the data processing method described above and perform displaying on the display 2.

The writing pen 1 can be used for writing on the display, and may detect the inclination angle of the writing pen and transmit it to the processor. The writing pen may be an electromagnetic pen or a capacitive pen.

In an exemplary embodiment, the processor may be an SOC (System on Chip), and the processor and the display may be connected through interfaces such as usb/I2C/Uart to realize the communication of touch data at the physical layer. The SOC may include a calculation processing unit and a storage unit, may receive and process external events, and control the content output of the display 2.

The touch input of the SOC comes from a touch module of the display 2. Whether it is the touch event of the writing pen 1 (i.e. the writing track point position) or the touch event of the hand (i.e., the touch track point position), the application layer receives them as a MotionEvent (motion) event, and the getToolType method can be used to distinguish whether it is a touch event of the writing pen 1 or a touch event of the hand. After the SOC receives the touch event, it can render the touch track at the application layer, or the event can be processed in the system level. If it is determined that the current hand touch event is within the shielding area, the event is discarded and not reported to the application layer. The above mainly takes the application layer rendering shielding as an example to illustrate the determination method of hand accidental touch.

In an exemplary embodiment, the display may include a first touch module and a second touch module. The first touch module may receive a touch signal of the writing pen 1 (i.e., the writing track point position) and the inclination angle of the writing pen 1 relative to the display 2 when writing. The first touch module may be an electromagnetic touch module or a capacitive touch module. The second touch module may be an infrared touch module or a resistive touch module. The second touch module may receive the touch track point position of the user, that is, receive the touch track point position of a finger.

Further, an exemplary embodiment further provides a storage medium including computer-executable instructions. When the computer-executable instructions are executed by a computer processer, the computer processor is caused to perform the above data processing method.

It should be noted that although several modules or units of the device for performing actions are mentioned in the above detailed description, this division of the modules or units is not mandatory. Indeed, according to embodiments of the present disclosure, the features and functions of two or more modules or units described above may be embodied in one module or unit. Conversely, the features and functions of one module or unit described above may be further divided into multiple modules or units.

From the description of the above embodiments, those skilled in the art can easily understand that the exemplary embodiments described herein may be implemented by software, or may be implemented by software combined with necessary hardware. Therefore, the technical solutions according to the embodiments of the present disclosure may be embodied in the form of a software product, and the software product may be stored in a non-volatile storage medium (which may be a CD-ROM, U disk, mobile hard disk, etc.) or on a network, including several instructions to cause a computing device (which may be a personal computer, a server, a mobile terminal, or a network device, etc.) to perform the methods according to embodiments of the present disclosure.

Other embodiments of the present disclosure will become apparent to those skilled in the art upon consideration of the specification and practice of the disclosure. The present disclosure is intended to cover any variations, uses, or adaptations of the present disclosure that follow the general principles of the present disclosure and include common knowledge or techniques in the technical field not disclosed by the present disclosure. The description and examples are to be regarded as exemplary only, and the true scope and spirit of the present disclosure are defined by the appended claims.

What is claimed is:

1. A data processing method, performed by a display with a touch function, the method comprising:
   obtaining a writing track point position when a writing pen writes on the display, and an inclination angle of the writing pen relative to the display when the writing pen writes on the display;

obtaining a touch track point position of a user on the display at a current moment;

obtaining a holding parameter for holding the writing pen;

determining a shielding area for a touch at the current moment according to the holding parameter, the inclination angle and the writing track point position, wherein the writing track point position is received at the current moment or within a set time period threshold earlier than the current moment; and when touch track point position is located in the shielding area, not displaying a track of the touch track point position on the display, wherein the holding parameter comprises a distance between a pen-holding endpoint where a user holds the writing pen and a pen tip, and a radius of a first shape.

2. The data processing method according to claim 1, wherein determining the shielding area for the touch at the current moment according to the holding parameter, the inclination angle and the writing track point position comprises:

determining an orthographic projection point of the pen-holding endpoint on the display according to the writing track point position, the inclination angle and the distance between the pen-holding endpoint and the pen tip; and determining the shielding area according to the radius of the first shape and the orthographic projection point.

3. The data processing method according to claim 2, wherein determining the orthographic projection point of the pen-holding endpoint on the display according to the writing track point position, the inclination angle and the distance between the pen-holding endpoint and the pen tip comprises:

establishing a rectangular coordinate system with the writing track point position at the current moment as an origin, wherein a horizontal axis of the rectangular coordinate system is parallel to a sky side of the display, and a vertical axis of the rectangular coordinate system is perpendicular to the horizontal axis; and performing calculations according to the following formula:

$$\begin{cases} Dx = \pm Lg\cos\alpha \\ Dy = -Lg\cos\beta \end{cases},$$

where Dx is an abscissa value of the orthographic projection point in the rectangular coordinate system, Dy is an ordinate value of the orthographic projection point in the rectangular coordinate system, L is the distance between the pen-holding endpoint and the pen tip, a is an included angle between the writing pen and the horizontal axis, and β is an included angle between the writing pen and the vertical axis.

4. The data processing method according to claim 3, wherein before obtaining the touch track point position of the user on the display at the current moment, the method further comprises:

obtaining a type of the pen-holding endpoint, wherein the type of the pen-holding endpoint is a second pen-holding endpoint or a first pen-holding endpoint, and a distance between the first pen-holding endpoint and the pen tip is smaller than a distance between the second pen-holding endpoint and the pen tip; and obtaining a shape of the shielding area, wherein the shape of the shielding area is a circle, an ellipse, a semicircle, a sector or a rectangle.

5. The data processing method according to claim 4, wherein the pen-holding endpoint is the second pen-holding endpoint, and the shape of the shielding area is the circle, the semicircle or the sector;

wherein determining the shielding area according to the radius of the first shape and the orthographic projection point comprises:

determining that the shielding area is a circle, a semicircle or a sector with the orthographic projection point as a center and the radius of the first shape as a radius.

6. The data processing method according to claim 4, wherein the pen-holding endpoint is the first pen-holding endpoint, and the shape of the shielding area is the semicircle or the rectangle;

wherein determining the shielding area according to the radius of the first shape and the orthographic projection point comprises:

determining a boundary point of the shielding area according to the radius of the first shape and the orthographic projection point;

determining a size determination value of the shielding area according to the boundary point and the writing track point position; and determining the shielding area according to the boundary point and the size determination value.

7. The data processing method according to claim 6, wherein determining the boundary point of the shielding area according to the radius of the first shape and the orthographic projection point comprises:

determining a point being located on an extension line of a connecting line for connecting the orthographic projection point and the writing track point position as the boundary point, wherein the extension line is an extension line with the orthographic projection point as a starting point, and a distance between the boundary point and the orthographic projection point does not exceed the radius of the first shape.

8. The data processing method according to claim 7, wherein the shape of the shielding area is the semicircle;

wherein determining the size determination value of the shielding area according to the boundary point and the writing track point position comprises:

determining that the size determination value of the shielding area is a radius of the semicircle, wherein the radius is a distance between the writing track point position and the boundary point.

9. The data processing method according to claim 8, wherein determining the shielding area according to the boundary point and the size determination value comprises:

determining a semicircle with the boundary point as a center and away from the orthographic projection point as the shielding area.

10. The data processing method according to claim 7, wherein the shape of the shielding area is the rectangle;

wherein determining the size determination value of the shielding area according to the boundary point and the writing track point position comprises:

determining that the size determination value is a length and width of the rectangle, wherein the width is a distance between the writing track point position and the boundary point, and the length is n times the width, and n is a positive integer greater than or equal to 1.

11. The data processing method according to claim 10, wherein determining the shielding area according to the boundary point and the size determination value comprises:

determining that the boundary point is a center point of a long side of the rectangle, wherein the other long side of the rectangle is located on a side of the boundary point away from the orthographic projection point.

12. The data processing method according to claim 1, wherein parameters of the pen-holding endpoint are pre-stored, and the parameters of the pen-holding endpoint comprises a plurality of first pen-holding endpoint values or a plurality of second pen-holding endpoints values, and the first pen-holding endpoint values are less than the second pen-holding endpoint values;
   a plurality of the pre-stored first pen-holding endpoint values are obtained, and a plurality of first sub-shielding areas are formed according to the plurality of first pen-holding endpoint values; and a range covered by the plurality of the first sub-shielding areas is determined the shielding for the touch at the current moment; or
   a plurality of the pre-stored second pen-holding endpoint values are obtained, and a plurality of second sub-shielding areas are formed according to the plurality of second pen-holding endpoint values; and a range covered by the plurality of the second sub-shielding areas is determined the shielding for the touch at the current moment.

13. The data processing method according to claim 1, further comprising:
   in response to a pen-lifting operation of the writing pen, obtaining a duration of the pen-lifting operation, and if the duration exceeds the set time period threshold, cancelling the shielding area for the touch.

14. An intelligent interactive device, comprising:
   a display with a touch function, wherein the display is used to receive a touch track point position of a user, a writing track point position of a writing pen and an inclination angle of the writing pen relative to the display when the writing pen writs on the display, and provide the touch track point position, the writing track point position and the inclination angle to a processor; and
   the processor configured to:
   obtain the writing track point position when a writing pen writes on the display, and the inclination angle of the writing pen relative to the display when the writing pen writes on the display;
   obtain a touch track point position of a user on the display at a current moment;
   obtain a holding parameter for holding the writing pen;
   determine a shielding area for a touch at the current moment according to the holding parameter, the inclination angle and the writing track point position, wherein the writing track point position is received at the current moment or within a set time period threshold earlier than the current moment; and
   when touch track point position is located in the shielding area, not display a track of the touch track point position on the display, wherein the holding parameter comprises a distance between a pen-holding endpoint where a user holds the writing pen and a pen tip, and a radius of a first shape.

15. The intelligent interactive device according to claim 14, further comprising:
   a writing pen configured to write on the display, and capable of detecting the inclination angle of the writing pen and transmitting the inclination angle to the processor.

16. The intelligent interactive device according to claim 14, wherein the processor is configured to:
   determine an orthographic projection point of the pen-holding endpoint on the display according to the writing track point position, the inclination angle and the distance between the pen-holding endpoint and the pen tip; and
   determine the shielding area according to the radius of the first shape and the orthographic projection point.

17. The intelligent interactive device according to claim 16, wherein the processor is configured to:
   establish a rectangular coordinate system with the writing track point position at the current moment as an origin, wherein a horizontal axis of the rectangular coordinate system is parallel to a sky side of the display, and a vertical axis of the rectangular coordinate system is perpendicular to the horizontal axis; and
   perform calculations according to the following formula:

$$\begin{cases} Dx = \pm L g \cos \alpha \\ Dy = -L g \cos \beta \end{cases},$$

where Dx is an abscissa value of the orthographic projection point in the rectangular coordinate system, Dy is an ordinate value of the orthographic projection point in the rectangular coordinate system, L is the distance between the pen-holding endpoint and the pen tip, a is an included angle between the writing pen and the horizontal axis, and β is an included angle between the writing pen and the vertical axis.

18. The intelligent interactive device according to claim 17, wherein the processor is further configured to:
   before obtain the touch track point position of the user on the display at the current moment, obtain a type of the pen-holding endpoint, wherein the type of the pen-holding endpoint is a second pen-holding endpoint or a first pen-holding endpoint, and a distance between the first pen-holding endpoint and the pen tip is smaller than a distance between the second pen-holding endpoint and the pen tip; and
   obtain a shape of the shielding area, wherein the shape of the shielding area is a circle, an ellipse, a semicircle, a sector or a rectangle.

* * * * *